United States Patent
Eddy et al.

(10) Patent No.: US 9,792,223 B2
(45) Date of Patent: Oct. 17, 2017

(54) PROCESSOR INCLUDING LOAD EPT INSTRUCTION

(71) Applicant: VIA ALLIANCE SEMICONDUCTOR CO., LTD., Shanghai (CN)

(72) Inventors: Colin Eddy, Austin, TX (US); Terry Parks, Austin, TX (US)

(73) Assignee: VIA ALLIANCE SEMICONDUCTOR CO., LTD., Shanghai (CN)

(*) Notice: Subject to any disclaimer, the term of this patent is extended or adjusted under 35 U.S.C. 154(b) by 95 days.

(21) Appl. No.: 14/727,242

(22) Filed: Jun. 1, 2015

(65) Prior Publication Data

US 2016/0335194 A1    Nov. 17, 2016

Related U.S. Application Data

(60) Provisional application No. 62/159,776, filed on May 11, 2015.

(51) Int. Cl.
| | | |
|---|---|---|
| *G06F 12/00* | (2006.01) | |
| *G06F 12/1009* | (2016.01) | |
| *G06F 9/455* | (2006.01) | |

(52) U.S. Cl.
CPC ...... *G06F 12/1009* (2013.01); *G06F 9/45533* (2013.01); *G06F 9/45545* (2013.01); *G06F 2212/1021* (2013.01); *G06F 2212/657* (2013.01)

(58) Field of Classification Search
CPC ......... G06F 12/1009; G06F 2212/1021; G06F 2212/657; G06F 9/45533; G06F 9/45545
See application file for complete search history.

(56) References Cited

U.S. PATENT DOCUMENTS

2008/0046679 A1* 2/2008 Bennett ............... G06F 12/1009
711/207

* cited by examiner

*Primary Examiner* — Shawn X Gu
(74) *Attorney, Agent, or Firm* — Gary Stanford; James W. Huffman

(57) ABSTRACT

A processor including an extended page table (EPT) translation mechanism that is enabled for virtualization, and a load EPT instruction. When executed by the processor, the load EPT instruction directly invokes the EPT translation mechanism to directly convert a provided guest physical address into a corresponding true physical address. The EPT translation mechanism may include an EPT paging structure and an EPT tablewalk engine. The EPT paging structure is generated and stored in an external system memory when the EPT translation mechanism is enabled. The EPT tablewalk engine is configured to access the EPT paging structure for the physical address conversion. The EPT tablewalk engine may perform relevant checks to trigger EPT misconfigurations and EPT violations during execution of the load EPT instruction.

18 Claims, 3 Drawing Sheets

PROCESSOR INCLUDING LOAD EPT INSTRUCTION

CROSS-REFERENCE TO RELATED APPLICATIONS

This application claims the benefit of U.S. Provisional Applications Ser. No. 62/159,776, filed on May 11, 2015 which is hereby incorporated by reference in its entirety for all intents and purposes.

BACKGROUND OF THE INVENTION

Field of the Invention

The present invention relates in general to address translations performed by a processor, and more particularly to a load extended page table (EPT) instruction that may be executed when virtualization is enabled to directly convert a guest physical address into a true physical address.

Description of the Related Art

Modern processors support virtual memory capability. A virtual memory system maps, or translates, virtual (a.k.a., "linear") addresses used by a program to physical addresses used by hardware to address system memory. Virtual memory provides the advantages of hiding the fragmentation of physical memory from the program and facilitating program relocation. Virtual memory thus allows the program to see a larger memory address space than the actual physical memory available to it. These advantages are particularly beneficial in modern systems that support time-sharing of the processor by multiple programs or processes.

An operating system (OS) implements the virtual memory system by creating and maintaining in system memory translation tables, often referred to as page tables, in a paged virtual memory system. The page tables map virtual addresses to physical addresses of system memory coupled to the processor. The translation tables may be in the form of a hierarchy of tables, some of which map virtual addresses to intermediate table addresses. When a program accesses memory using a virtual address, the translation tables are accessed in sequential order to accomplish the translation of the virtual address to its physical address, commonly referred to as a page table walk, or "tablewalk."

Many processors also support virtual machine extensions (VMX) that enable virtualization of the processor hardware for multiple software environments. As described in Chapter 28 of the Intel® 64 and IA-32 Architectures Software Developer's Manual, Volume 3C: System Programming Guide, January 2015 (referred to herein as the "Intel® system programming guide"), which is hereby incorporated by reference in its entirety for all intents and purposes, the architecture includes two features that support address translation for VMX operation, including virtual-processor identifiers (VPIDs) and the extended page-table (EPT) mechanism. VPIDs provide a mechanism for translations of virtual addresses, whereas the EPT mechanism defines a layer of address translation that augments the translation of the virtual addresses. A hypervisor or the like virtualizes system resources to enable multiple independent operating systems to share the same hardware resources. Each OS implementing a virtual memory system is unaware, however, that its page tables are also virtualized. Each "physical address" of an OS is instead treated as a "guest" physical address that must be further translated through a set of EPT paging structures to produce a "true" physical address that may be used to access the system memory.

When virtualization is active, the EPT mechanism is nested within the normal tablewalk process to convert each guest physical address from the page tables into a corresponding true physical address to access the actual corresponding page table stored in the system memory. The EPT mechanism includes an EPT tablewalk engine that supplements the tablewalk process by accessing the EPT paging structures to convert guest physical addresses into true physical addresses. In this manner, multiple EPT conversions are performed during each tablewalk in a virtualized system architecture.

Conventional processors that support virtual machine extensions to enable virtualization of the processor hardware for multiple software environments often include the EPT translation mechanism for conversion of virtual addresses into physical addresses to access system memory. Conventional processors do not, however, have a mechanism to directly convert a guest physical address into a true physical address apart from the standard address translation process.

SUMMARY OF THE INVENTION

A processor according to one embodiment includes an extended page table (EPT) translation mechanism that is enabled for virtualization, and a load EPT instruction. When executed by the processor, the load EPT instruction directly invokes the EPT translation mechanism to directly convert a provided guest physical address into a corresponding true physical address. The EPT translation mechanism may include an EPT paging structure and an EPT tablewalk engine. The EPT paging structure is generated and stored in an external system memory when the EPT translation mechanism is enabled. The EPT tablewalk engine is configured to access the EPT paging structure for the physical address conversion. The EPT tablewalk engine may perform relevant checks to trigger EPT misconfigurations and EPT violations during execution of the load EPT instruction.

A method of operating a processor according to one embodiment includes enabling an extended page table (EPT) translation mechanism during virtualization, and executing a load EPT instruction including directly invoking the EPT translation mechanism to convert a provided guest physical address into a corresponding true physical address.

A computer program product encoded in at least one non-transitory computer usable medium for use with a computing device according to one embodiment includes computer usable program code embodied in the medium, for specifying a processor, including first program code and second program code. The first program code specifies an extended page table (EPT) translation mechanism that is enabled for virtualization. The second program code specifies a load EPT instruction, which when executed by the processor, directly invokes the EPT translation mechanism to directly convert a provided guest physical address into a corresponding true physical address.

DETAILED DESCRIPTION

A processor as described herein supports virtualization including an EPT translation mechanism for converting a "guest" physical address into a "true" physical address to access system memory. When virtualization is not active or otherwise not enabled, a virtual memory system enables processes running on the processor to convert virtual addresses directly into the physical addresses that correctly access the intended location in the system memory. When virtualization is enabled, however, one or more processes of each of one or more operating systems (OSs) or one or more virtual machines (VMs) operates within a guest environment. During virtualization, a virtualization scheme effectively virtualizes the memory system, so that each OS or VM is unaware that it does not have direct access to the system memory. Instead, the virtual memory system produces "guest" physical addresses that will not correctly access the intended locations in the system memory. Each guest physical address must further be converted, or redirected, to the corresponding true physical address to correctly access the proper system memory location.

A processor as described herein processor supports an EPT translation mechanism that is embedded within the virtual memory system during virtualization to convert guest physical addresses into the true physical addresses. As described herein, the processor further incorporates a load EPT instruction that enables direct conversion from a guest physical address into a corresponding true physical address, which was not available in conventional processors. The load EPT instruction directly invokes the EPT translation mechanism to perform the correct conversion. The load EPT instruction provides a convenient mechanism for directly converting physical addresses when such conversion may be necessary by the processor. For example, the load EPT instruction provides support for the physical address extension (PAE) paging mode, as further described herein, to enhance address translation for the EPT addressing mode. Any other situation in which the processor needs to directly convert a guest physical address into the corresponding true physical address is supported by a processor described herein.

Figure 1:
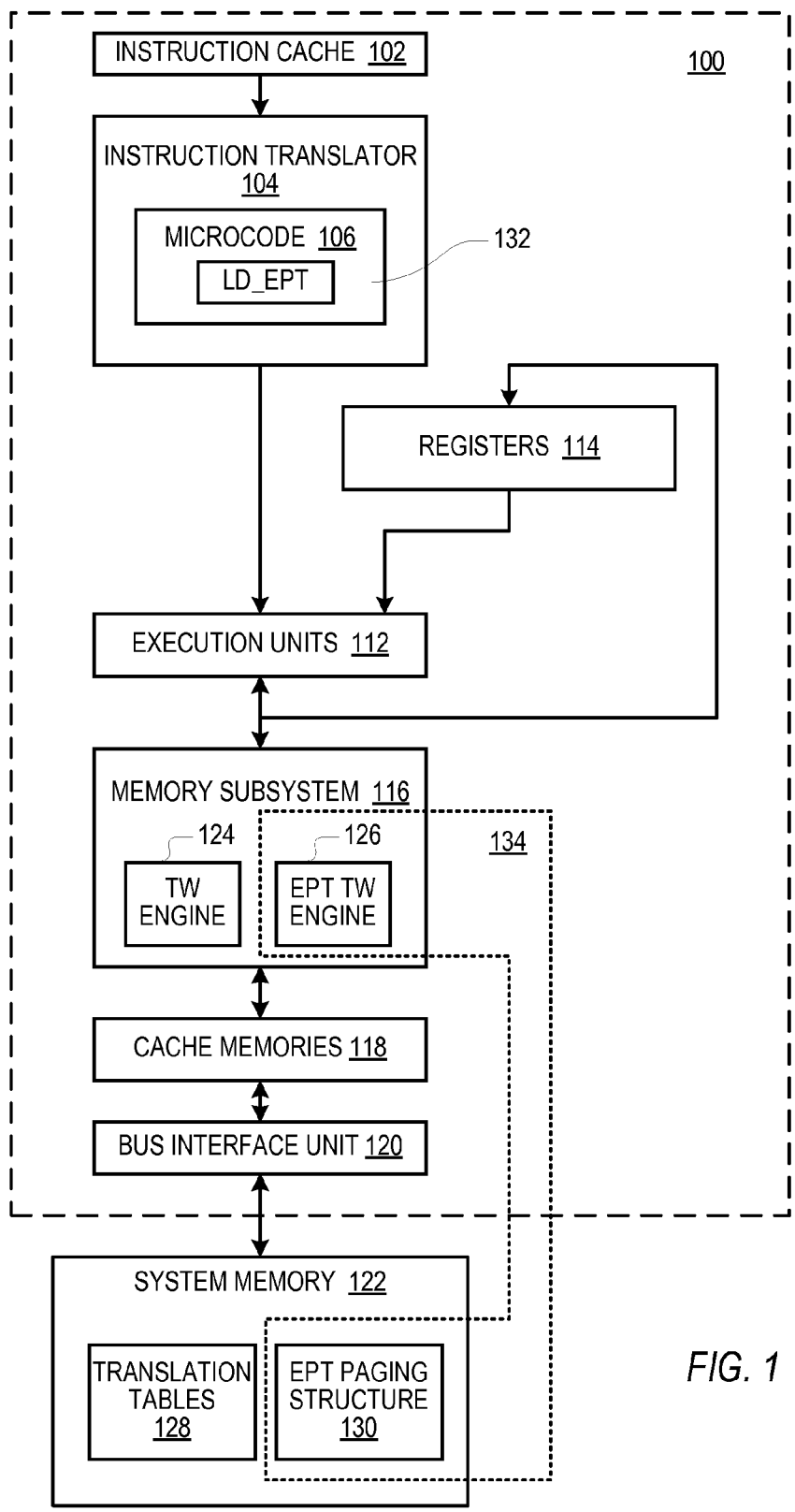
FIG. 1 is a block diagram of a processor that includes a microcode unit which incorporates a load EPT instruction implemented according to one embodiment of the present invention.

FIG. 1 is a block diagram of a processor 100 that includes a microcode unit 106 which incorporates a load EPT instruction implemented according to one embodiment of the present invention. The processor 100 includes an instruction cache 102, an instruction translator 104, execution units 112, architectural registers 114, a memory subsystem 116, a cache memory hierarchy 118 and a bus interface unit 120. The instruction translator 104 may include the microcode unit 106, although alternative configurations are contemplated. Other functional units (not shown) may include branch predictors, a reorder unit, a reorder buffer, reservations stations, an instruction scheduler, and data prefetch units, among other possible functional units. In one embodiment, the microprocessor 100 has an out-of-order execution microarchitecture in which instructions may be issued for execution out of program order. In one embodiment, the microprocessor 100 has a superscalar microarchitecture that is capable of issuing multiple instructions per clock cycle to the execution units 112 for execution. In one embodiment, the microprocessor 100 conforms substantially to the x86 instruction set architecture (ISA). It is appreciated, however, that other ISAs are contemplated in which the present invention is not limited to the x86 ISA.

The instruction cache 102 caches architectural instructions fetched from system memory 122 with which the bus interface unit 120 communicates. A translation look-aside buffer (TLB, not shown) may be associated with the instruction cache 102 that caches address translations for instructions. In one embodiment, the instruction translator 104 translates the architectural instructions fetched from the instruction cache 102 into microinstructions of a microinstruction set of the microarchitecture of the microprocessor 100. The execution units 112 execute the microinstructions to perform the functions intended by the set of architectural instructions.

The execution units 112 receive source operands from the architectural registers 114 (or perhaps from the reorder buffer or a forwarding bus). Operands are loaded into the registers 114 from the system memory 122 via the memory subsystem 116. The memory subsystem 116 writes data to and reads data from the cache memory hierarchy 118 (e.g., level-1 data cache, level-2 cache, level-3 cache). Each cache memory may have an associated TLB. If a cache miss occurs to the last level cache of the cache hierarchy 118, the data or instruction cache line is requested from the bus interface unit 120, which fetches the cache line from the system memory 122.

The memory subsystem 116 includes a tablewalk (TW) engine 124, which performs address translation tablewalks to generate virtual to physical address translations. The TW engine 124 accesses translation tables 128 (referred to as paging structures in the x86 ISA, for example) in the system memory 122 to perform page tablewalks to generate virtual to physical address translations, which are subsequently loaded into the TLBs of the processor 100. The translation tables 128 may include tables that map a page (e.g., x86 ISA page tables) or that reference other translation tables 128 (e.g., x86 ISA page directories, page-directory-pointer tables, PML4 tables) in a translation table hierarchy.

In the illustrated embodiment, the processor 100 supports virtualization, such as the virtual machine extensions (e.g., x86 ISA VMX) that enable virtualization of the processor hardware. When virtualization is enabled, the processor 100 enables operation of an EPT TW engine 126 within the memory subsystem 116 to facilitate physical address translations. The processor 100 also generates an extended page table (EPT) paging structure 130 (e.g., according to x86 ISA parlance) in the system memory 122 that maps virtualized physical addresses, otherwise known as guest physical addresses, to true physical addresses (otherwise referred to as host physical addresses in the x86 ISA, for example). The EPT TW engine 126 accesses the EPT paging structure 130 to perform EPT physical address translation. When virtualization is enabled, the TW engine 124 cooperates with the EPT TW engine 126 to access the translation tables 128 and the EPT paging structure 130 to convert virtual addresses to corresponding true physical addresses for enabling access to indicated memory locations of the system memory 122 as further described herein. The EPT TW engine 126 and the EPT paging structure 130 are collectively referred to as the EPT translation mechanism 134.

The microcode unit 106 may include a microcode memory (e.g., read-only memory or ROM) configured to store microcode, or microcode routines, and a microsequencer (not shown) for fetching from the microcode memory instructions of the microcode. In one embodiment, the microcode instructions are microinstructions; in one embodiment the microcode instructions are translated into microinstructions. The microcode implements some of the architectural instructions, such as particularly complex architectural instructions. The microcode includes microcode routines or the like for performing various functions of the processor 100. In the illustrated configuration, the microinstructions include a load EPT instruction 132 shown within the microcode unit 106 with mnemonic "LD_EPT." As described further herein, the LD_EPT instruction 132 directly accesses the EPT translation mechanism 134, which is normally accessed directly only by the TW engine 124. In particular, the LD_EPT instruction 132 directly invokes the EPT TW engine 126 to access the EPT paging structure 130 to directly convert a provided guest physical address into a corresponding true physical address.

Figure 2:
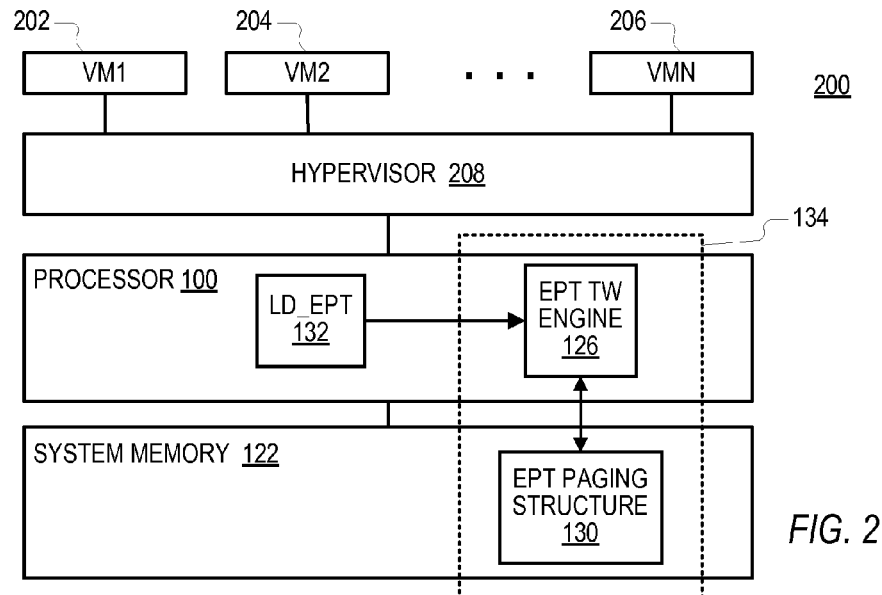
FIG. 2 is a simplified block diagram of a virtualization system implemented according to a suitable virtualization scheme using the processor of FIG. 1.

FIG. 2 is a simplified block diagram of a virtualization system 200 implemented according to a suitable virtualization scheme using the processor 100. The processor 100 is coupled to the system memory 122 such as via the bus interface unit 120 as previously described. The processor 100 supports the VMX or the like for enabling the virtualization scheme, so that the processor 100 may provide support for virtualization of hardware resources. A hypervisor 208 operates as a virtual machine monitor (VMM) and acts as host to one or more "N" virtual machines (VMs), shown individually as VM1 202, VM2 204, . . . , VMN 206. N may be zero (0) or any positive integer. The hypervisor 208 has full control of the processor 100 and enables shared access to system resources, such as the processor 100, the system memory 122, and other hardware resources interfaced with the processor 100 (e.g., keyboard, video, mouse, graphics, storage devices, input/output (I/O) ports, etc.). Each VM 202-206 is a guest software environment that supports a corresponding operating system and application software, and that operates independently of other VMs. The hypervisor 208 manages access of the system resources by each of the VMs 202-206. The microcode unit 106 of the processor 100 incorporates microcode instructions and routines and the like to facilitate virtualized operation.

When virtualization is enabled, the processor 100 enables operation of the EPT TW engine 126 and generates the EPT paging structure 130 in the system memory 122. In general, for virtualization, the processor 100 enables an EPT translation mechanism 134 to perform physical address translations. The microcode unit 106 also includes the LD_EPT instruction 132, which when executed, directly invokes the EPT translation mechanism 134 to convert a provided guest physical address into a corresponding true physical address.

Figure 3:
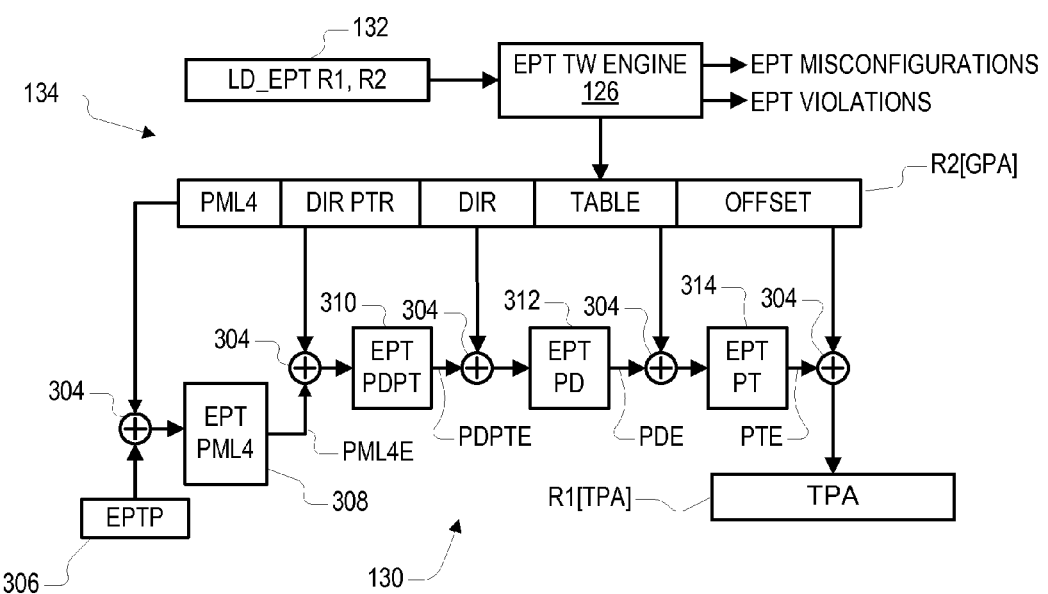
FIG. 3 is a block diagram illustrating operation of the load EPT instruction according to one embodiment of the present invention, in which the LD_EPT instruction directly invokes the EPT translation mechanism by directly invoking the EPT TW engine to use the EPT paging structure of FIG. 1 to directly perform the physical address translation.

FIG. 3 is a block diagram illustrating operation of the load EPT (LD_EPT) instruction 132 according to one embodiment of the present invention, in which the LD_EPT instruction 132 invokes the EPT translation mechanism 134 by directly invoking the EPT TW engine 126 to use the EPT paging structure 130 to directly perform the physical address translation. The load EPT instruction 132 is specified with a corresponding code syntax. In one embodiment, the syntax includes the mnemonic LD_EPT followed by first and second registers R1 and R2 that store operands used for the instruction. The first register R1 is used as a destination register for holding the results of execution of the instruction, and the second register R2 is used as a source register for storing the input operand. A guest physical address GPA, which is the input operand, is loaded into the source register R2, and when the LD_EPT instruction 132 is executed, the EPT TW engine 126 cooperates with the EPT paging structure 130 to generate and load a corresponding true physical address TPA into the destination register R1.

In one embodiment, the EPT paging structure 130 includes an EPT pointer EPTP 306, which points to an EPT page map level 4 (PML4) table 308. A first portion of the GPA from the source register R2 is a PML4 value, which is added as an offset to the EPTP 306 to retrieve a PML4 entry PML4E from the EPT PML4 table 308. A series of adders 304 are shown for performing the add functions. The PML4E points to an EPT page-directory-pointer (PDPT) table 310. A second portion of the GPA is a director pointer DIR PTR, which is added to the PML4E to retrieve an EPT PDPT entry PDPTE from the EPT PDPT table 310. The PDPTE points to an EPT page directory (PD) table 312. A third portion of the GPA is a directory pointer DIR, which is added to the PDPTE to retrieve an EPT PD entry PDE from the EPT PD table 312. The PDE points to an EPT page table (PT) 314. A fourth portion of the GPA is a table pointer TABLE, which is added to the PDE to retrieve an EPT PT entry PTE from the EPT PT 314. A fifth portion of the GPA is an offset value OFFSET, which is added to the PTE to form the true physical address TPA, which is loaded into the destination register R1.

During operation of the EPT translation mechanism 134, including those invoked by the LD_EPT instruction 132, the EPT TW engine 126 may detect EPT misconfigurations and EPT violations. An EPT misconfiguration generally refers to errors in certain bits of the EPT paging structure 130. An EPT violation may occur during an access using a guest physical address whose translation did not cause an EPT misconfiguration. One example of an EPT violation occurs when translation of the guest physical address encounters an EPT paging structure entry that is not present. In this manner, the LD_EPT instruction 132 directly invoking the EPT translation mechanism 134 performs the relevant checks for generating and indicating the EPT misconfigurations and violations.

Figure 4:
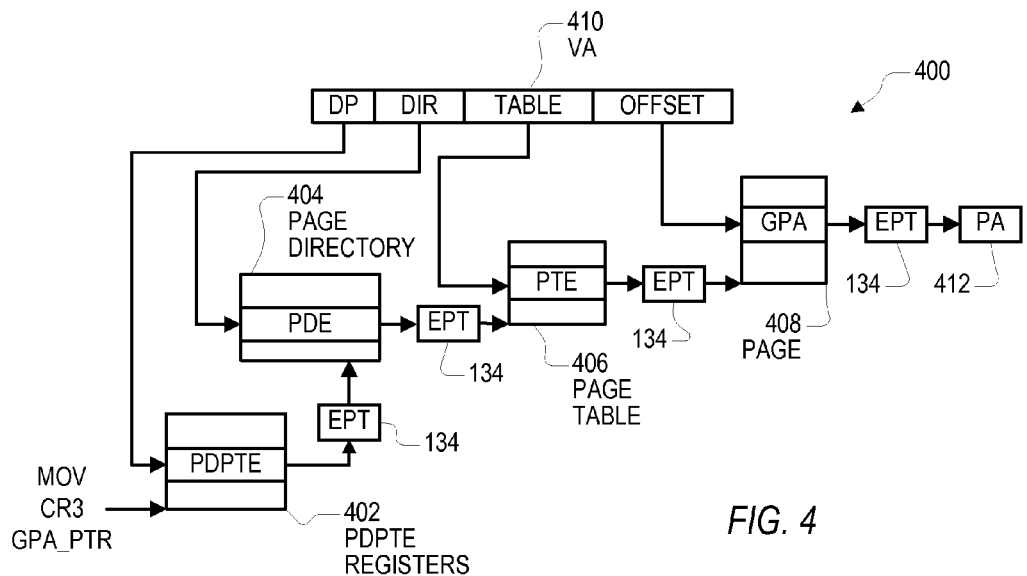
FIG. 4 illustrates a PAE paging structure used for virtual address translation to a 4-KByte page using PAE paging while the EPT translation mechanism of FIG. 1 is enabled for virtualization.

FIG. 4 illustrates a PAE paging structure 400 used for virtual address translation to a page 408 (e.g., 4K byte page) using PAE paging while the EPT translation mechanism 134 is enabled for virtualization. A virtual machine, such as VM1 202 of the virtualization system 200, for example, may choose to employ PAE paging for a given configuration. It is understood that alternative address translation mechanisms may be defined with different paging structures. The PAE paging structure 400 uses a set of page directory pointer table entry (PDPTE) registers 402, a page directory 404, a page table 406 and the page 408 to convert a virtual address (VA) 410 into a physical address (PA) 412. In one embodiment, a MOV instruction is executed to load a control register CR3 with a pointer PTR to the base of the PDPTE registers 402. This MOV instruction causes the microcode unit 106 to execute a microcode routine to load the PDPTE registers 402 with PAE pointer values from the system memory 122. When virtualization is not active, the pointer PTR is a true physical address, or TPA_PTR, that enables direct loading of the PAE pointer values from the system memory 122 into the PDPTE registers 402. In other words, the provided pointer PTR is a true physical address which correctly addresses the PAE pointer values from the system memory 122 when virtualization is used.

When virtualization is enabled, however, the pointer PTR is not a true physical address, but instead is a guest physical address, or GPR_PTR. The guest physical address must first be converted to a true physical address to properly access the PAE pointer values at the correct location within the system memory 122. The LD_EPT instruction 132 facilitates this process by directly invoking the EPT translation mechanism 134 to directly convert the guest physical address into a true physical address to access the correct location of the system memory 122.

It is further noted that when virtualization is enabled, the output values of each of the directories/tables 402, 404, 406, and 408 during the PAE paging mode are also guest physical addresses. The GPA outputs of each PAE table are converted to corresponding true physical addresses using an EPT translation mechanism 134. It is noted that the EPT translation mechanism 134 enables the PA 412 to be a true physical address for accessing the system memory 122.

Once the PDPTE registers 402 have been properly loaded with the PAE pointer values, a PAE conversion mechanism uses the PAE paging structure 400 to convert the VA 410 to the physical address PA 412. During conversion, a first portion of the VA 410 is a directory pointer DP that selects a PDPTE value from a corresponding one of the PDPTE registers 402. The selected PDPTE value output from the PDPTE registers 402 is converted by the EPT conversion mechanism 134 into a physical address that points to a base of the page directory 404. A second portion of the virtual address 410 is a directory value DIR that selects a PDE value from the page directory 404. The PDE value is converted by the EPT conversion mechanism 134 to a physical address value that points to a base of the page table 406. A third portion of the virtual address 410 is a value TABLE that selects a PTE value from the page table 406, which is converted by the EPT conversion mechanism 134 to a physical address value that points to a base of the page 408. A fourth portion of the virtual address 410 is an OFFSET value that selects a guest physical address value from the page 408, which is converted by the EPT conversion mechanism 134 to the PA 412. The PA 412 is intended as the converted value of the VA 410.

Figure 5:
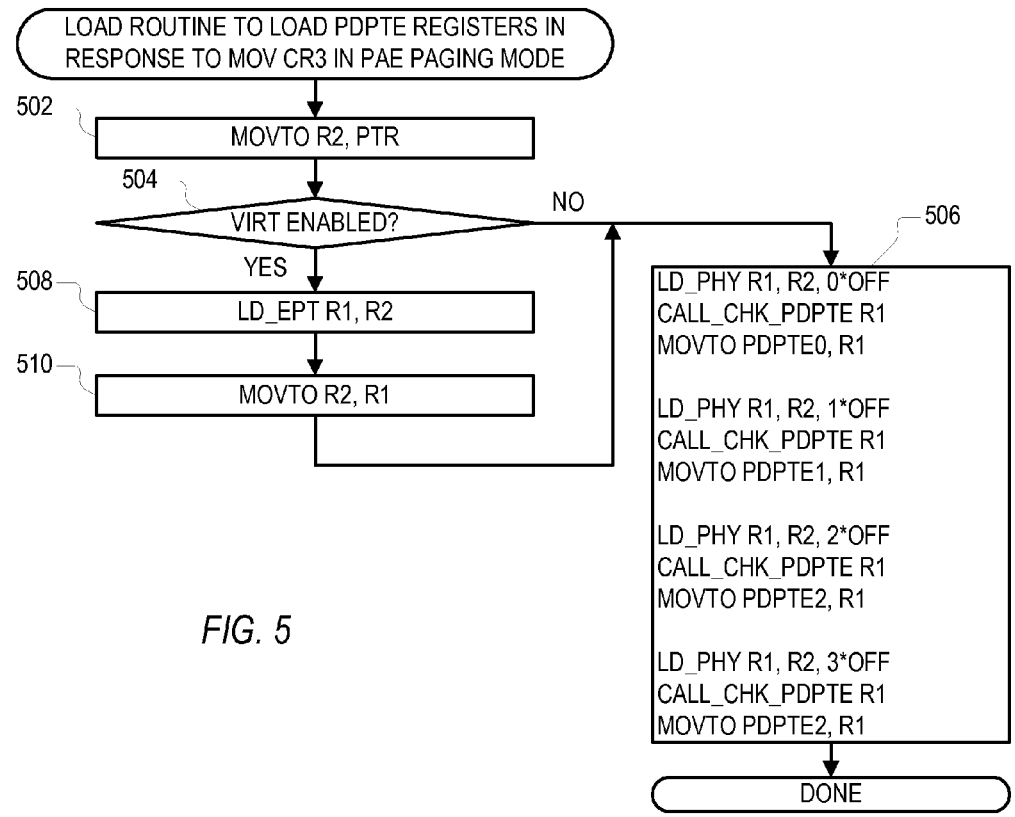
FIG. 5 is a flowchart diagram of a microcode load routine that may be used to load the PDPTE registers of FIG. 4 from the system memory according to one embodiment.

FIG. 5 is a flowchart diagram of a microcode load routine that may be used to load the PDPTE registers 402 from the system memory 122 according to one embodiment. As previously described, a MOV instruction that loads the control register CR3 with a pointer PTR to the base of the PDPTE registers 402 causes the microcode unit 106 to execute the microcode load routine to load the PDPTE registers 402 with PAE pointer values from the system memory 122. At first block 502, a MOVTO instruction moves the pointer PTR value into a suitable destination register, shown as R2. The PTR value may be in another register, or the actual PTR value may be moved depending upon the particular instruction. At this point, the PTR may be a true physical address pointer (TPT_PTR, when virtualization is not enabled), or may be a guest physical address pointer (GPT_PTR, when virtualization is enabled). At next block 504, it is queried whether virtualization (VIRT) is enabled. Virtualization may be indicated by an EPT parameter or the like indicating operation of a virtualization scheme. When virtualization is not enabled, such that EPT is not enabled, then the pointer PTR is a true physical address TPA_PTR that enables direct loading of the PAE pointer values into the PDPTE registers 402. In that case, operation proceeds directly to block 506 to directly load the PAE pointer values.

At block 506, an instruction LD_PHY is used to load the TPA_PTR value from the register R2 into a register R1. The LD_PHY includes a third operand which is an offset of the source value provided in the source register R2. In the first set of instructions, the offset is shown as zero (0) times a predetermined offset value OFF (in which an asterisk "*" denotes multiplication). Thus, the first LD_PHY instruction causes the contents of the location in the system memory 122 addressed by the true physical address in R2 to be loaded into the register R1. The next instruction CALL_CHK_PDPTE checks the value loaded from the system memory 122 into R1 for validity to be used as a PDPTE value in the PDPTE registers 402. If not valid, then operation aborts and an error routine (not shown) is executed. Otherwise, assuming the value in R1 is valid, operation proceeds to a next instruction MOVTO PDPTE0, R1 which causes the contents of R1 to be moved into the first location PDPTE0 of the PDPTE registers 402. A zero "0" at the end of the location name, (e.g., the "0" at the end of PDPTE0), denotes the first consecutive location of the PDPTE registers 402.

The next set of instructions is similar except using an offset value of one (1) times OFF for the LD_PHY instruction (LD_PHY R1, R2, 1*OFF). In this case, the offset OFF is added to the pointer value in R2 and the result stored in R1 is used as a true physical address in the system memory 122. The value of OFF is an arbitrary value used for the particular configuration and generally points to the next memory location in the system memory 122 for loading into the PDPTE registers 402. In one embodiment, for example, OFF may represent 8 bytes, although alternative offset values are contemplated. As before, the next value from the system memory 122 is first loaded into the register R1, and then is checked for validity using the CALL_CHK_PDPTE instruction. If valid, the value from the register R1 is moved into the next location of the PDPTE registers 402, shown as PDPTE1. A one "1" at the end of the location name, or PDPTE1, denotes the second consecutive location of the PDPTE registers 402.

The instructions are essentially repeated two more times with offsets of 2*OFF and 3*OFF, respectively, for loading the next two PAE pointer values from the system memory 122 into the third and fourth consecutive locations of the PDPTE registers 402, or PDPTE2 and PDPTE3, respectively. Once the PDPTE registers 402 are loaded, operation is completed.

Referring back to block 504, if virtualization is enabled for virtualization, then the PTR value in register R2 is not a true physical address but instead is a guest physical address. If the guest physical address were to be used at block 506, then it would point to an incorrect location in the system memory 122 and cause improper operation. In this case, operation instead proceeds to block 508 in which the LD_EPT instruction is first executed to convert the guest physical address pointer GPA_PTR stored in R2 into a true physical address pointer TPA_PTR loaded into R1. As previously described, the LD_EPT instruction directly invokes the EPT translation mechanism 134 (using EPT TW engine 126 accessing the EPT paging structure 130) to convert the guest physical address into a true physical address. In this case, the source register is R2 which holds GPA_PTR, and the corresponding converted true physical address pointer TPA_PTR is loaded into the destination register R1.

After conversion of the physical address pointer to a true physical address PTR loaded into R1, operation proceeds to next block 510 to transfer TPA_PTR into the register R2. Operation then proceeds to block 506 to load the four consecutive positions of the PDPTE registers 402 with the four consecutive values from the system memory 122 beginning at the first memory location pointed to by the true physical address pointer TPA_PTR in R2. Once the PDPTE registers 402 are loaded at block 506, operation is completed.

It is now appreciated that an LD_EPT instruction facilitates situations in which a guest physical address needs to be directly converted to a true physical address for properly accessing the system memory 122. Setting up the PAE paging mode is one situation in which the LD_EPT instruction facilitates direct physical address conversion. It is understood, however, that the LD_EPT instruction may be used by the processor 100 at any time by any other functions in which direct physical address translation is needed.

Although an embodiment has been described with respect to the x86 ISA, the load EPT instruction or similar form may be employed in other ISAs, such as the ARM, MIPS or Sun ISAs. The load EPT instruction as described herein may be used in any ISA that supports a virtualization scheme. It is also apparent to persons skilled in the relevant computer arts that various changes in form and detail can be made therein without departing from the scope of the invention. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A processor, comprising:
an extended page table (EPT) translation mechanism that is enabled for virtualization; and
a load EPT instruction that specifies a first internal memory location that stores a provided guest physical address and that specifies a second internal memory location, which when executed by the processor, directly invokes said EPT translation mechanism to directly convert said provided guest physical address into a corresponding true physical address which is loaded into said second internal memory location.

2. The processor of claim 1, wherein said first and second internal memory locations comprise internal registers of the processor.

3. The processor of claim 1, further comprising:
a bus interface for interfacing an external system memory; and
wherein said EPT translation mechanism comprises:
an EPT paging structure that is generated and stored in said system memory when said EPT translation mechanism is enabled; and
an EPT tablewalk engine that is configured to access said EPT paging structure to convert said guest physical address into said corresponding true physical address.

4. The processor of claim 3, wherein the processor generates said EPT paging structure as a plurality of extended page tables in said system memory, and wherein said EPT tablewalk engine uses selected portions of said guest physical address as offsets to access entries within said plurality of extended page tables to convert said guest physical address into said corresponding true physical address.

5. The processor of claim 3, wherein said EPT paging structure comprises an EPT pointer, an EPT page map table, a page directory pointer table, a page directory table, and a page table, and wherein said guest physical address comprises a plurality of values in which each of said plurality of values is added to a corresponding entry retrieved from said EPT paging structure by said EPT tablewalk engine during execution of said load EPT instruction.

6. The processor of claim 3, wherein said EPT tablewalk engine performs relevant checks during execution of said load EPT instruction to trigger EPT misconfigurations and EPT violations.

7. The processor of claim 1, further comprising an activation routine stored in an internal memory for supporting physical address extension paging, wherein said activation routine executes said load EPT instruction during enabling of said physical address extension paging to convert said guest physical address into said corresponding true physical address for loading at least one physical address from an external system memory into an internal pointer table memory located within the processor.

8. A method of operating a processor, comprising:
enabling an extended page table (EPT) translation mechanism during virtualization;
executing a load EPT instruction including directly invoking the EPT translation mechanism to convert a provided guest physical address into a corresponding true physical address;
specifying a first memory location for storing the guest physical address when executing the load EPT instruction; and
specifying a second memory location for storing the true physical address when executing the load EPT instruction.

9. The method of claim 8, further comprising:
generating and storing an EPT paging structure in an external system memory when the EPT translation mechanism is enabled; and
during said executing the load EPT instruction, accessing the EPT paging structure to convert the guest physical address into the corresponding true physical address.

10. The method of claim 9, wherein:
said generating and storing an EPT paging structure comprises providing a plurality of extended page tables in the external system memory; and
wherein said accessing the EPT paging structure comprises using selected portions of the guest physical address as offsets to access entries within the plurality of extended page tables to convert the guest physical address into the corresponding true physical address.

11. The method of claim 10, wherein said providing a plurality of extended page tables comprises providing an EPT pointer, an EPT page map table, a page directory pointer table, a page directory table, and a page table.

12. The method of claim 10, wherein said using selected portions of the guest physical address as offsets comprises adding an entry retrieved from the EPT paging structure to a selected portion of the guest physical address during execution of the load EPT instruction.

13. The method of claim 8, further comprising performing relevant checks when executing the load EPT instruction to trigger EPT misconfigurations and EPT violations.

14. The method of claim 8, further comprising enabling physical address extension paging including executing the load EPT instruction to convert the guest physical address into the corresponding true physical address for loading at least one physical address from an external system memory into an internal pointer table memory located within the processor.

15. A computer program product encoded in at least one non-transitory computer usable medium for use with a computing device, the computer program product comprising:
computer usable program code embodied in said medium, for specifying a processor, the computer usable program code comprising:
first program code for specifying an extended page table (EPT) translation mechanism that is enabled for virtualization; and
second program code for specifying a load EPT instruction that specifies an internal memory location of said processor that stores a provided guest physical address and that specifies a second internal memory location, which when executed by the processor, directly invokes said EPT translation mechanism to directly convert said provided guest physical address into a corresponding true physical address which is loaded into said second internal memory location.

16. The computer program product of claim 15, wherein said first program code comprises:
third program code for specifying an EPT paging structure that is generated and stored in an external system memory when said EPT translation mechanism is enabled; and
fourth program code for specifying an EPT tablewalk engine that is configured to access said EPT paging structure to convert said guest physical address into said corresponding true physical address.

17. The computer program product of claim 15, wherein the computer usable program code further comprises third program code for specifying an EPT tablewalk engine that performs relevant checks during physical address conversion to trigger EPT misconfigurations and EPT violations.

18. The computer program product of claim 15, wherein the computer usable program code further comprises third program code for specifying an activation routine that executes said load EPT instruction during enabling of a physical address extension paging to convert said guest physical address into said corresponding true physical address for loading at least one physical address from an external system memory into an internal pointer table memory.

* * * * *